US007844637B2

(12) United States Patent
Gibson et al.

(10) Patent No.: US 7,844,637 B2
(45) Date of Patent: Nov. 30, 2010

(54) METHOD FOR MANAGING KEYBOARD NAVIGATION WITHIN A TREE CONTROL STRUCTURE USER INTERFACE COMPONENT VIA A LINKED LIST

(75) Inventors: Becky J. Gibson, Westford, MA (US); Daniel A. Gisolfi, Hopewell, NY (US); Laurent Hasson, New York, NY (US); Mark A. Pilgrim, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 503 days.

(21) Appl. No.: 11/855,798

(22) Filed: Sep. 14, 2007
(Under 37 CFR 1.47)

(65) Prior Publication Data
US 2009/0077123 A1 Mar. 19, 2009

(51) Int. Cl.
*G06F 7/00* (2006.01)
*G06F 17/30* (2006.01)
(52) U.S. Cl. .................. 707/800; 707/797; 707/805; 715/854
(58) Field of Classification Search .............. 707/100, 707/102, E17.012, E17.011, 999.1, 999.102, 707/705, 791, 793, 795, 800, 805; 715/854, 715/841, 700, 773, 762, 856
See application file for complete search history.

(56) References Cited

U.S. PATENT DOCUMENTS

| | | | | |
|---|---|---|---|---|
| 5,263,160 A * | 11/1993 | Porter et al. | .................... | 707/3 |
| 5,442,795 A * | 8/1995 | Levine et al. | ................ | 715/775 |
| 6,185,569 B1 * | 2/2001 | East et al. | .................... | 707/101 |
| 6,285,366 B1 | 9/2001 | Ng et al. | | |
| 6,314,424 B1 | 11/2001 | Kaczmarski et al. | | |
| 7,058,636 B2 | 6/2006 | Coldewey | | |
| 7,076,636 B1 | 7/2006 | Chilton | | |
| 2005/0015396 A1 * | 1/2005 | Vu | ............................ | 707/100 |
| 2005/0055529 A1 | 3/2005 | Lubbers et al. | | |
| 2006/0200455 A1 | 9/2006 | Wilson | | |

* cited by examiner

*Primary Examiner*—Greta L Robinson
(74) *Attorney, Agent, or Firm*—Dillon & Yudell LLP

(57) ABSTRACT

A method, data processing system and computer program product for maintaining/updating managing keyboard navigation using a linked list. In particular, a Dynamic Tree Control Linkage (DTCL) utility creates a doubly linked list with list nodes having assigned values based on a tree control structure UI component. Each list node of the doubly linked list corresponds to a visible tree item of the tree structure UI component. Responding to a keyboard event signal, the DTCL utility finds a current list node corresponding to a first current tree item. The DTCL utility finds a next (i.e. previous or subsequent) list node corresponding to a next tree item. The DTCL utility detects a list node exists. The DTCL utility detects whether the next list node is associated with a null value. When the next list node is associated with a non-null value, the next tree item is identified. The DTCL utility returns an identification of the next tree item representing a second current tree item. The DTCL utility also updates the doubly linked list in response to the expansion/collapsion of the current list item. The DTCL utility avoids the need to number all tree items (both visible and hidden tree items) sequentially by adding list node(s) to or removing list node(s) from the linked list to represent the visible tree items.

12 Claims, 6 Drawing Sheets

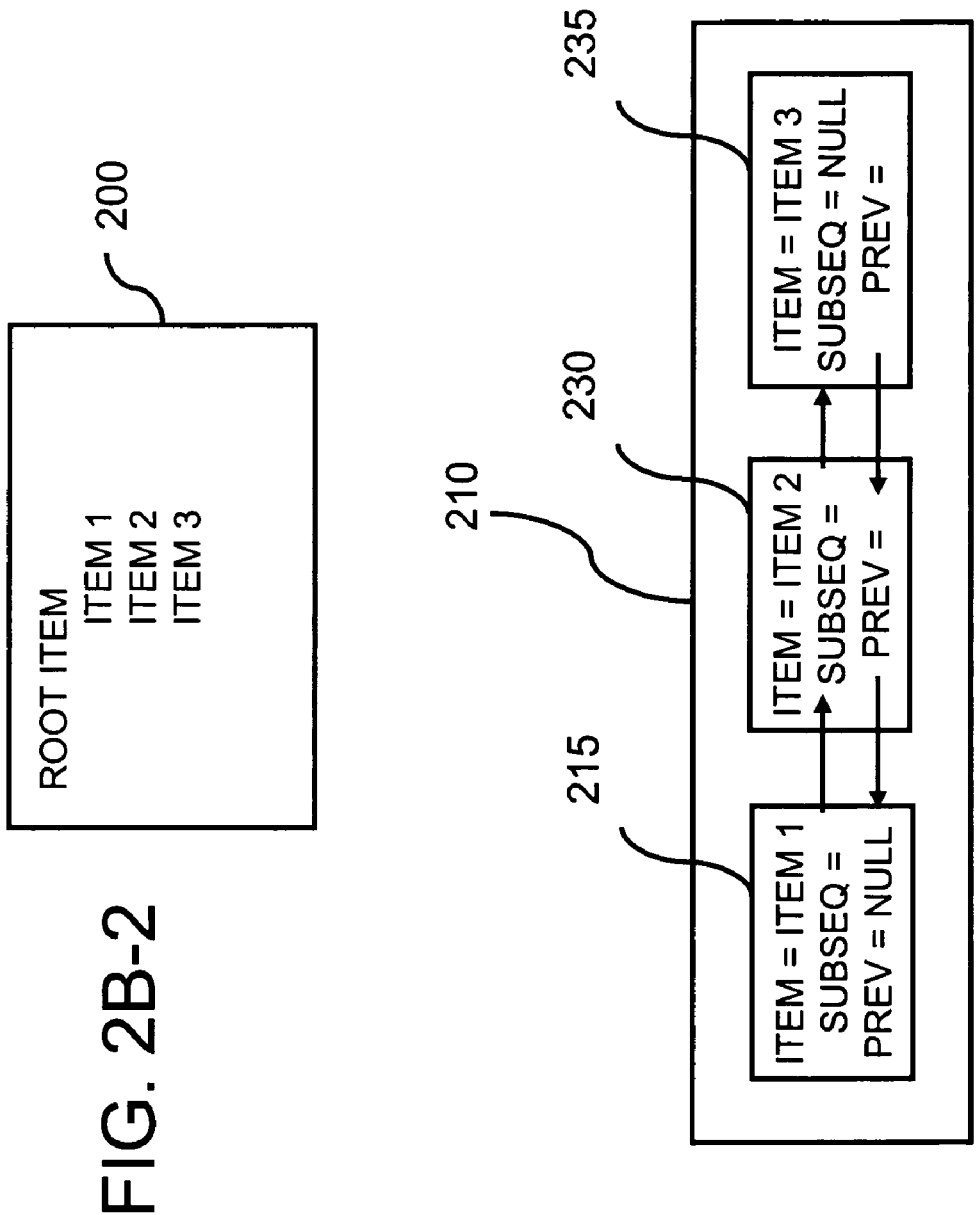

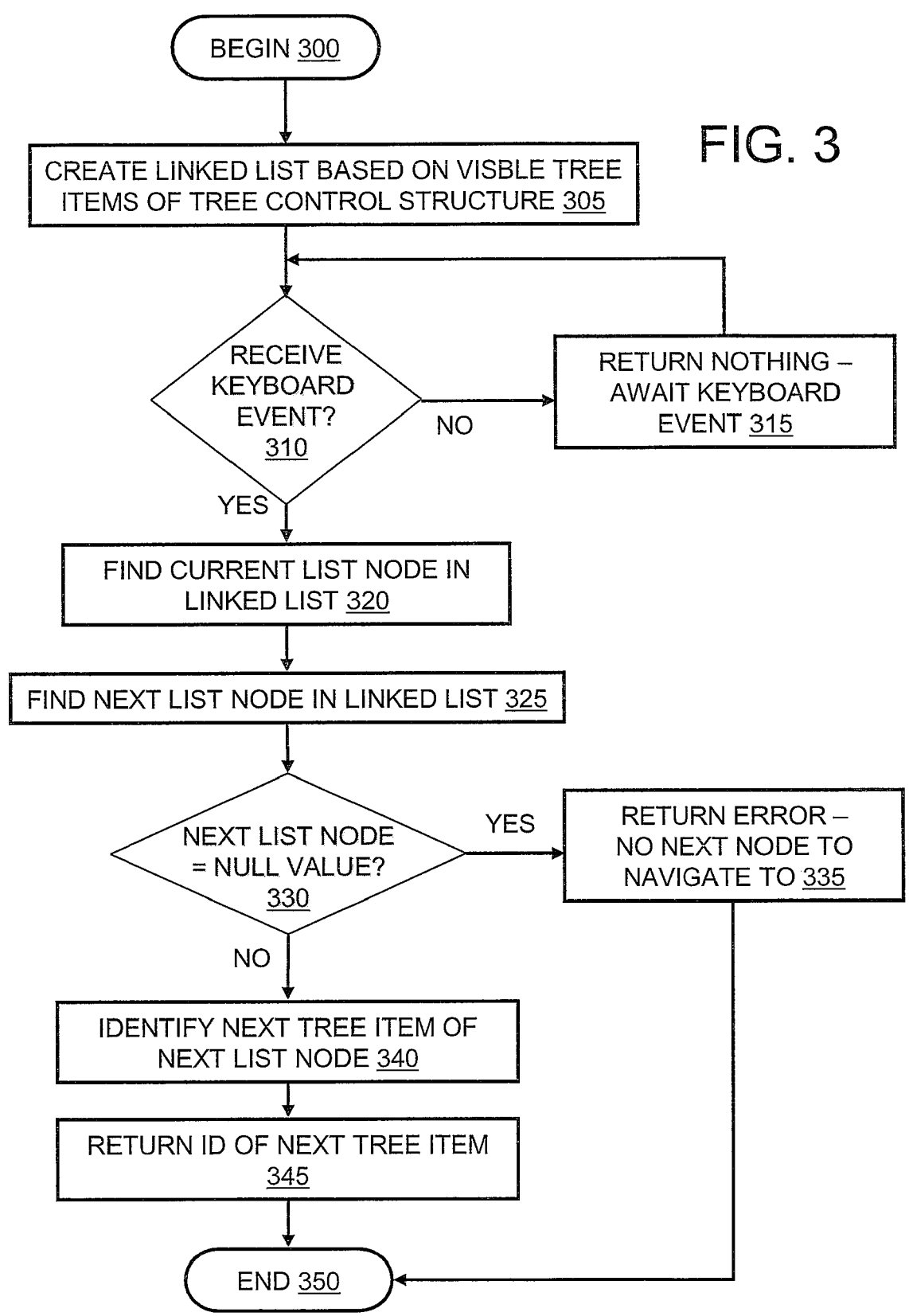

US 7,844,637 B2

METHOD FOR MANAGING KEYBOARD NAVIGATION WITHIN A TREE CONTROL STRUCTURE USER INTERFACE COMPONENT VIA A LINKED LIST

BACKGROUND OF THE INVENTION

1. Technical Field

The present invention generally relates to computer systems and in particular to a method and system for managing keyboard navigation within a tree control structure user interface (UI).

2. Description of the Related Art

Navigating through a Dynamic HyperText Markup Language (HTML)-based tree control structure UI component can present challenges to users who require assistive technologies. Conventional HTML-based implementations of a tree control operation have generally utilized mouse navigation. Mouse navigation obviates the problem of determining the "next" (i.e. previous or subsequent) node to navigate to since the user controls mouse navigation by directly clicking on a tree item to set focus to the tree item. However, in the case of users requiring assistive technologies, keyboard navigation, as opposed to mouse navigation, is the preferred tool with which the user can navigate through a tree control structure.

Implementing keyboard navigation of a tree control structure does present some challenges. In a Dynamic HTML-based tree control structure UI component, providing keyboard navigation to a tree control structure is difficult because of the varying expanded and collapsed states of tree nodes. In contrast to mouse navigation, keyboard navigation requires arrowing up and down within a tree control structure until the desired item is reached. For example, when arrowing down in a tree control structure, all of the expanded or visible intermediate tree items of a particular branch are navigated to before navigating to the next desired tree item.

In keyboard navigation of a tree control structure, determining the subsequent and previous nodes when traversing the tree control structure depends upon the expanded and collapsed state of the tree items of the tree control structure. One possible way to determine the next tree item to traverse when navigating through the tree control structure is to identify each tree item in the tree control structure based on the tree item's order within the tree control structure when all of the tree items are expanded and to mark each tree item as visible or hidden. Thus, to navigate down the tree control structure, the current tree item would be queried for the current tree item's identification (ID), which is usually associated with a numeral, such that the next item in the tree would be identified as ID+1. The ID+1 tree item would be obtained and queried to determine if the ID+1 tree item is expanded ID+1's children are visible. If the ID+1 tree item is visible, ID+1 would become the next navigable tree item. However, if ID+1 is not visible, the search would continue for the next visible tree item by adding 1 again and querying the next tree item (i.e. ID+2). Thus, in order to traverse downwards in the tree, each subsequent tree item after the current tree item would have to be queried to determine whether each subsequent tree item is visible or not.

Continuing with the method described above, when a particular tree item is collapsed, all of the children of that particular tree item would need to be updated to reflect that the children are no longer visible. Likewise, when a particular tree item is expanded, all of the children of that particular tree item would need to be updated to reflect that the children are now visible. Notably, the updating of collapsed or expanded tree items requires a recursive search since tree items may themselves contain additional branch tree items, each branch tree item having its own collapsed or expanded state. This method of (i) ordering nodes in sequential order, (ii) keeping track of the expanded and collapsed state of each branch tree item, and (iii) keeping track of the visible and hidden state of all the tree items is deemed too complex for conventional keyboard navigation of a tree control structure.

Another method for keyboard navigation of a tree control structure is to number the tree items sequentially based on their respective level within the tree control structure's hierarchy. The level in the hierarchy would be used as the ID of the tree item. At each subsequent level in the hierarchy, the numbering would begin again. In addition, each tree item would be labeled as expanded or collapsed. Under such an implementation, when arrowing down, the current tree item would be identified and checked to see if the current tree item has children. If the tree item has children and is expanded, first child of the tree item would be deemed the next tree item. If the tree item either does not have children, as in the case of a leaf tree item, or is not expanded, the next tree item would be the current tree item number+1. Similar to the first method disclosed above, this second method also represents a complex scheme because the second method relies on the numbering of tree items in a specific sequence for determining the next tree item to which to navigate. Moreover, neither of the above methods can be implemented if tree items have been added or removed from the tree control structure after the tree structure has been created and the IDs of the tree items have been assigned.

SUMMARY OF AN EMBODIMENT

Disclosed are a method, system, and computer program product for managing keyboard navigation within a tree control structure UI component. In particular, a Dynamic Tree Control Linkage (DTCL) utility creates a doubly linked list with list nodes having assigned values based on a tree control structure UI component. Each list node of the doubly linked list corresponds to a visible tree item of the tree structure UI component. Responding to a keyboard event signal (e.g. keyboard upward arrow signal, keyboard downward arrow signal, keyboard side arrow signal, previous, subsequent button key) the DTCL utility finds a current list node corresponding to a first current tree item. The DTCL utility finds a next (i.e. previous or subsequent) list node corresponding to a next tree item. The DTCL utility detects a list node exists. The DTCL utility detects whether the next list node is associated with a null value. When the next list node is associated with a non-null value, the next tree item is identified. The DTCL utility returns an identification of the next tree item representing a second current tree item. The DTCL utility also updates the doubly linked list in response to the expansion/collapsion of the current list item. The DTCL utility avoids the need to number all tree items (both visible and hidden tree items) sequentially by adding list node(s) to or removing list node(s) from the linked list to represent the visible tree items.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIGS. 2A-1 and 2A-2 illustrate a high level block diagram of a tree list control structure and its corresponding doubly linked list, respectively, in accordance with one embodiment of the invention;

FIGS. 2B-1 and 2B-2 illustrate a high level block diagram of an updated tree list control structure and its corresponding doubly linked list, respectively, when branch tree ITEM 1 of FIG. 2A has been collapsed, in accordance with one embodiment of the invention;

FIG. 3 is a high level logical flowchart illustrating the process of managing keyboard navigation within a tree control structure UI component, in accordance with one embodiment of the invention.

DETAILED DESCRIPTION OF AN ILLUSTRATIVE EMBODIMENT

The illustrative embodiments provide a method, system, and computer program product for managing keyboard navigation within a tree control structure user interface (UI) component using a linked list. As utilized herein, a tree control structure is a hierarchical structure that represents branch and leaf items. Branch items are tree items that contain children, such as other branch items and leaf items. A leaf item is at the end of the branch item and has no children. As utilized herein, a linked list is a fundamental data structure that consists of a sequence of nodes. Each node contains arbitrary data fields and one or two references (i.e. "links") pointing to the next (i.e. subsequent or previous) list node. The principal benefit of a linked list over a conventional array is that the order of the linked items may be different from the order that the data items are stored in memory or on disk, allowing the list of items to be traversed in a different order. A linked list is a self-referential datatype because the linked list contains a pointer or link to another datum of the same type. Linked lists permit insertion and removal of nodes at any point in the list in constant time, but do not allow random access. Several different types of linked lists exist: singly-linked lists, doubly-linked lists, and circularly-linked lists. In particular, a dynamic tree control linkage (DTCL) utility obviates the need to number branch and leaf tree items sequentially by adding list node(s) to or removing list node(s) from the linked list to represent the visible tree items.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

Figure 1:
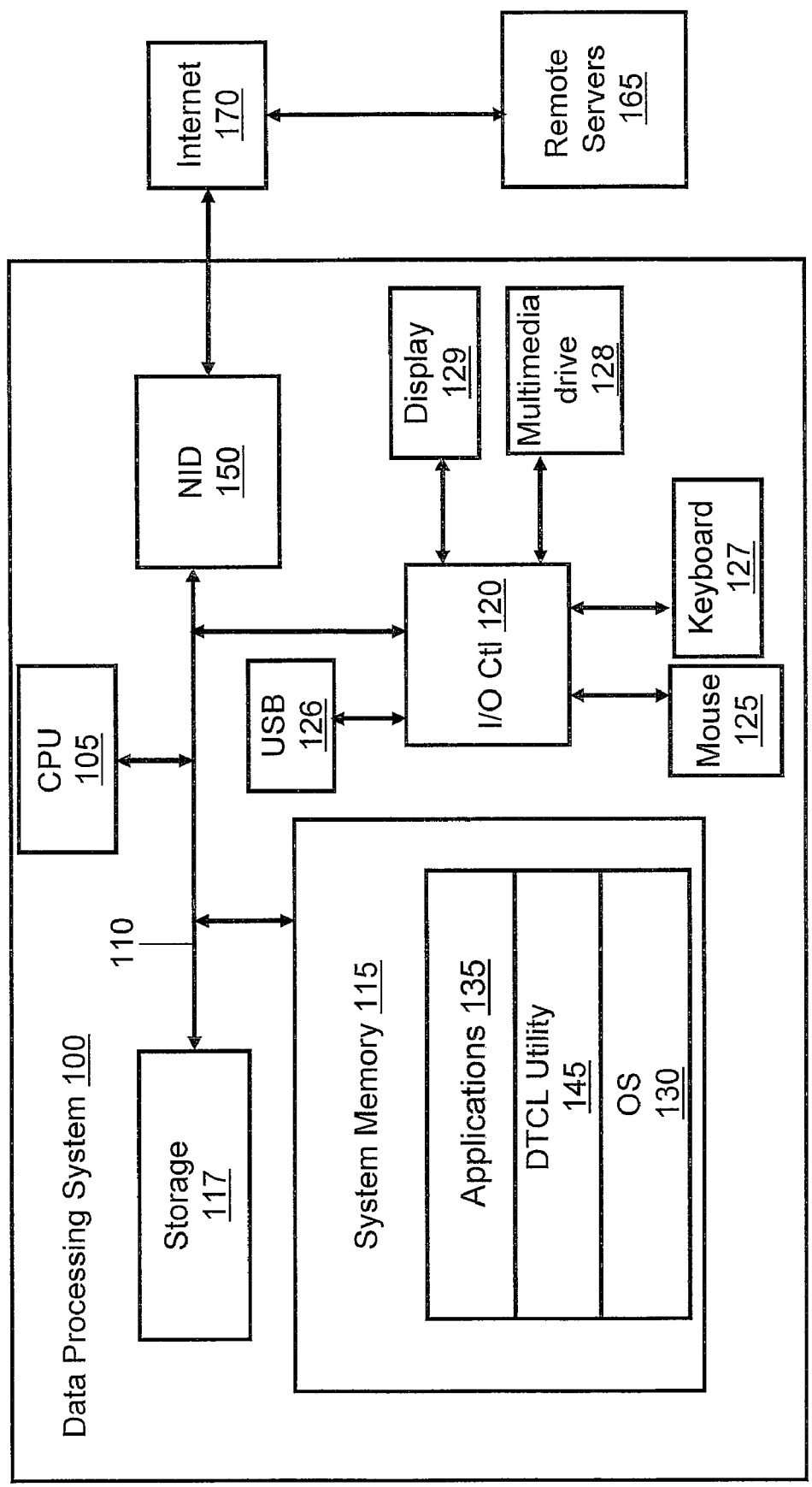
FIG. 1 is a high level block diagram representation of a data processing system, according to one embodiment of the invention.

With reference now to FIG. 1, depicted is a block diagram representation of a data processing system (DPS) (and connected network) 100. DPS 100 comprises at least one processor or central processing unit (CPU) 105 connected to system memory 115 via system interconnect/bus 110. Also connected to system bus 110 is I/O controller 120, which provides connectivity and control for input devices, of which pointing device (or mouse) 125 and keyboard 127 are illustrated, and output devices, of which display 129 is illustrated. Additionally, a multimedia drive 128 (e.g., CDRW or DVDRW drive) and Universal Serial Bus (USB) hub 126 are illustrated, coupled to I/O controller 120. Multimedia drive 128 and USB hub 126 may operate as both input and output (storage) mechanisms. DPS 100 also comprises storage 117, within which data/instructions/code may be stored. DPS 100 is also illustrated with a network interface device (NID) 150 coupled to system bus 110. NID 150 enables DPS 100 to connect to one or more servers 165 via an access network 170, such as the Internet.

In the described embodiments, when access network 170 is the Internet, access network represents a worldwide collection of networks and gateways that utilize the Transmission Control Protocol/Internet Protocol (TCP/IP) suite of protocols to communicate with one another. Of course, network access may also be provided via a number of different types of networks, such as an intranet, an Ethernet, a Local Area Network (LAN), a Virtual Private Network (VPN), or other Wide Area Network (WAN) other than the Internet, for example.

Notably, in addition to the above described hardware components of DPS 100, various features of the invention are completed via software (or firmware) code or logic stored within system memory 115 or other storage (e.g., storage 117) and executed by CPU 105. In one embodiment, data/instructions/code from storage 117 populates the system memory 115, which is also coupled to system bus 110. System memory 115 is defined as a lowest level of volatile memory (not shown), including, but not limited to, cache memory, registers, and buffers. Thus, illustrated within system memory 115 are a number of software/firmware components, including operating system (OS) 130 (e.g., Microsoft Windows®, a trademark of Microsoft Corp; or GNU®/Linux®, registered trademarks of the Free Software Foundation and The Linux Mark Institute; or Advanced Interactive eXecutive -AIX-, registered trademark of International Business Machines—IBM), applications (APP) 135, and Dynamic Tree Control Linkage (DTCL) utility 145. In actual implementation, components or code of OS 130 may be combined with those of DTCL utility 145, collectively providing the various functional features of the invention when the corresponding code is executed by the CPU 105. For simplicity, DTCL utility 145 is illustrated and described as a stand alone or separate software/firmware component, which is added to an existing OS to provide/support the specific novel functions described herein.

CPU 105 executes DTCL utility 145 as well as OS 130, which supports the UI features of DTCL utility 145. In the illustrative embodiment, DTCL utility 145 manages keyboard navigation within a tree control structure UI through the creation and use of a linked list. Among the software code/instructions provided by DTCL utility 145, and which are specific to the invention, are: (a) code for creating a linked list; (b) code for receiving a keyboard event signal; (c) code for finding a current list node in the linked list; (d) code for finding a next list node (i.e. subsequent list node or previous list node) in the linked list; (e) code for determining whether a next list node contains a null value; (f) responsive to receipt of a non-null value for the next list node, code for identifying next tree item of next list node and returning the identification (ID) of the next tree item. For simplicity of the description, the collective body of code that enables these various features is referred to herein as DTCL utility 145. As used herein, the term "next" refers to either (i) a previous or subsequent tree item or (ii) a previous or subsequent list node. According to the illustrative embodiment, when CPU 105 executes DTCL utility 145, DPS 100 initiates a series of functional processes that enable the above functional features as well as additional features/functionality, which are described below within the description of FIGS. 2A-5.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The data processing system depicted in FIG. 1 may be, for example, an IBM eServer pSeries system, a product of International Business Machines Corporation in Armonk, N.Y., running the AIX operating system or LINUX operating system.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1*xx* for FIGS. 1 and 2*xx* for FIG. 2A or 2B). The specific numerals assigned to the elements are provided solely to aid in the description and not meant to imply any limitations (structural or functional) on the invention.

Figures 1, 2A:
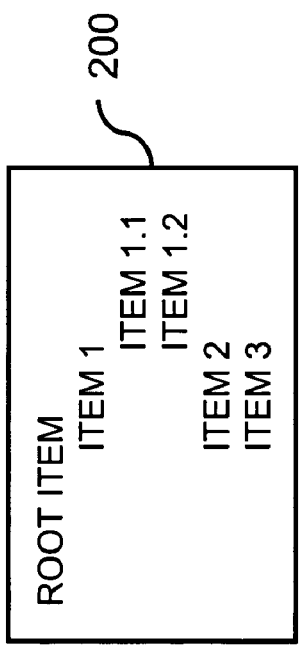
Figures 2, 2A:
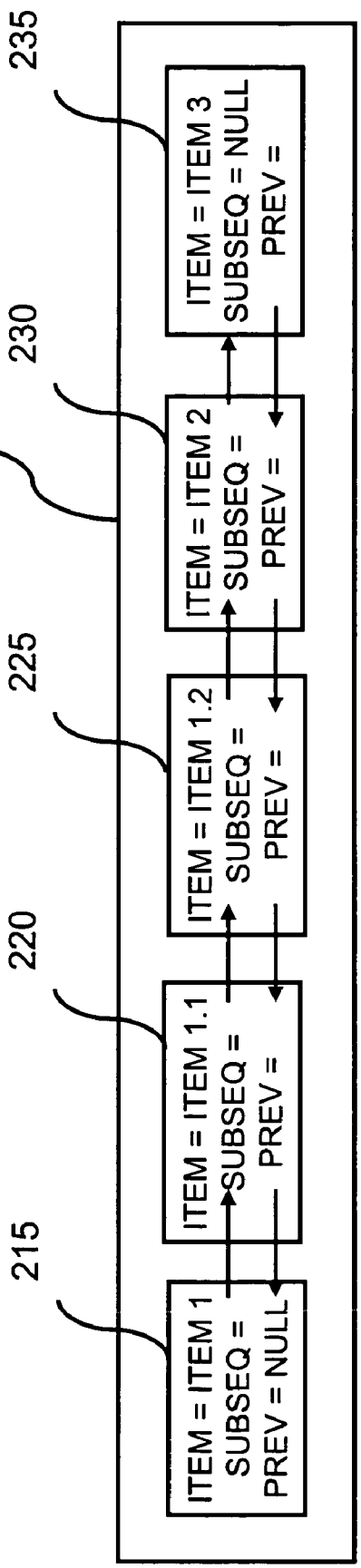

With reference now to FIGS. 2A-1 and 2A-2, an exemplary initial tree control structure 200 and a doubly linked list 210 are illustrated, according to one embodiment of the invention. The initial tree control structure 200 contains one or more tree items (e.g. Items 1, 1.1, 1.2, 2, and 3) in a hierarchical order. Using the example illustrated in FIGS. 2A-1, the tree control structure 200 includes root item, parent branch item 1, which in turn, contains sibling leaf items 1.1 and 1.2. Moreover, Items 2 and 3 of tree control structure 200 are also leaf tree items, since neither one has children.

Each tree item of tree control structure 200 is represented by an object (not shown). The process of representing tree items using objects is well known in the art of standard programming techniques. Each tree item object is identified by a unique ID, which for exemplary purposes is labeled 'itemID', where "ID" is represented by a numeral. Using JavaScript® scripting language, for example, the tree item object can be obtained via a standard application programming interface (API): document.getObjectById (itemID). Obtaining an object via a unique ID is standard in most programming languages. Note that although the exemplary embodiment of the invention is described using JavaScript® scripting language, the invention should not be limited in this regard and any number of scripting languages may be used to perform the same function.

Each tree item object maintains a list of its children. JavaScript® maintains child information in an array. In addition, each tree item object maintains the state of the tree item. As utilized herein, the state of a tree item is defined as either expanded or collapsed. When a tree item is expanded, the item's immediate children are visible. When a tree item is collapsed, the item's immediate children are not visible. For example, tree control structure 200 in FIGS. 2A-1 shows how ITEM 1 has already been expanded to reveal its children, ITEMS 1.1 and 1.2. Conversely, collapsing tree ITEM 1 would remove tree ITEMS 1.1 and 1.2 from view, leaving a visible tree hierarchy composed exclusively of sibling ITEMS 1-3, as illustrated in FIGS. 2B-1.

Typical keyboard navigation through tree control structure 200 would require one or more keyboard events (i.e. the press of a key). Keyboard navigation usually requires arrowing up and down within the tree control structure 200 until the desired item is reached. When arrowing up/down in a tree control, all of the expanded tree items of a particular branch are traversed before navigating to the next tree item. For example, if a user starts with focus at the root item in tree control structure 200 (FIG. 2A) and arrows down with keyboard 127 (FIG. 1), the tree items would be traversed in the following order: item 1, item 1.1, item 1.2, item 2, item 3. In like fashion, traversing up from item 3 of tree control structure 200 (FIG. 2A-1) would follow the reverse order: item 2, item 1.2, item 1.1, item 1. In addition, the expansion or collapse of a tree item would similarly require one or more keyboard events (i.e. the press of a key). For example, typical expansion of a tree item using keyboard navigation requires the arrowing right on a keyboard 127 (FIG. 1) when a current tree item within a tree control structure 200 is selected. Similarly, typical collapse of a tree item using keyboard navigation requires the arrowing left on a keyboard 127 (FIG. 1) when a current tree item within a tree control structure 200 is selected. However, it should be understood that the invention is not limited to the particular. keyboard events described in the embodiment. In this regard, keyboard keys other than arrow keys, may be configured for navigating and updating (i.e. expanding/collapsing) a tree control structure 200.

According to one embodiment of the invention, doubly linked list 210 is created based on initial tree control structure 200. As used herein, doubly linked list 210 is a type of linked list whereby each node has two links: (i) a first link points to the previous node, or points to a null value or empty list if the node is the first node; and (ii) a second link points to the subsequent node, or points to a null value or empty list if the node is the final node. As illustrated in FIGS. 2A-2, doubly linked list 210 includes multiple list nodes 215, 220, 225, 230, 235. Each list node 215, 220, 225, 230, 235 references a particular tree item (e.g. list node 215 corresponds to list item 1 of tree control structure 200 (i.e. ITEM 1)). Note that the root item of tree control structure 200 is not included in linked list 210. Notably, the linked list 210 and, in particular, each list node of the linked list 210, maintains references to each of the visible tree items of tree control structure 200, respectively, via the unique itemIDs associated with each tree item object. For example, FIG. 2A (1 and 2) shows how visible tree items 1, 1.1, 1.2, 2, and 3 are represented respectively by list nodes 1, 1.1, 1.2, 2, and 3. However, when tree item 1 of FIG. 2A is collapsed, as shown in FIGS. 2B-2, the linked list 210 is modified by the removal of list nodes 220, 225 to reflect only the remaining visible tree items 1, 2, and 3.

DTCL utility 145 (FIG. 1) initiates a process to create a ListNode class using scripting language. DTCL utility 145 (FIG. 1) creates linked list 210 when the tree control structure 200 is first created. The head of linked list 210 (i.e. list node 215) is stored as a variable in a TreeControl object. A determination is made as to whether one of the tree items illustrated in FIG. 2 (A-1 or B-1) is expanded. Responsive to the expansion of a tree item, the list node containing the itemID of the expanded node is found in the linked list. Responsive to the rendering of one or more children in HTML, a new node is created for each child and inserted into the linked list. Conversely, when a tree item is collapsed, the child nodes of the collapsed parent node are removed from the navigation linked list. The 'subseq' and 'prev' variables in ListNode store references to the subsequent and previous nodes in linked list 210. This mechanism is effective because the information is stored by reference. As a result, the mechanism avoids storing multiple copies of list nodes 215, 220, 225, 230, 235 in system memory 115 (FIG. 1).

Depending upon where the expansion/collapsion occurs on the tree control structure 200, the 'subseq' and 'prev' variables in list nodes 215, 220, 225, 230, 235 may be updated when a list node is added to or removed from the linked list 210. For example, when tree item 1 of FIGS. 2A-1 is collapsed, as shown in FIGS. 2B-1, only list nodes 215, 220, 225, and 230 are updated and list node 235 remains unchanged. Specifically, the linked list 210 is updated by (i) the removal of list nodes 220, 225, (ii) by changing the value of the 'subseq' variable of list node 215 to point to list node 230, and (iii) by changing the value of the 'prev' variable of list node 230 to point to list node 215, as illustrated in FIGS. 2B-2. Moreover, the linked list implementation contains additional functions to find, add, and remove list nodes from the linked list 210.

FIG. 3 is a flow chart illustrating the exemplary method of managing keyboard navigation within a tree control structure UI component using a linked list, according to an illustrative embodiment of the invention. Although the following methods illustrated in FIGS. 3-5 may be described with reference to components shown in FIGS. 1-2B, it should be understood that this exemplary method is merely for convenience and alternative components and/or configurations thereof can be employed when implementing the various methods. Key portions of the methods may be completed by DTCL utility 145 (FIG. 1) executing within DPS 100 (FIG. 1) and controlling specific operations of/on DPS 100 (FIG. 1), and the methods are thus described from the perspective of either/both DTCL utility 145 (FIG. 1) and DPS 100 (FIG. 1).

The process of FIG. 3 begins at initiator block 300 and proceeds to block 305, at which DTCL utility 145 (FIG. 1) creates a linked list 210 (FIG. 2) based on an initial tree control structure 200 (FIG. 2). To achieve initial creation of linked list 210 (FIG. 2), a ListNode class is created, employing a scripting language, such as JavaScript®. Given that tree items have a unique itemID, the itemID is stored in the item variable of the ListNode class when the corresponding ListNode class is created.

The process continues with decision block 310, in which a determination is made as to whether DTCL utility 145 (FIG. 1) has received a keyboard event (i.e. the arrowing up/down of button on keyboard 127 (FIG. 1)). If no keyboard event takes place, the process returns to decision block 310 and awaits a keyboard event. Responsive to a keyboard event, a current list node in linked list 210 (FIG. 2A) is searched given the starting list node, as depicted in block 320. A determination is made as to whether the next list node exists, as depicted in block 325. The above determination in block 325 is based on whether the next ListNode contains a null value (i.e. indicating that next list node is empty; next list node does not exist). If the next ListNode contains a null value, the process returns an error, as depicted in block 330, because the current list node is not found on the linked list 210 (FIG. 2). If next ListNode contains a non-null value (i.e. the next list node exists), another determination is then made as to whether the list node containing the current tree item is found, as depicted in block 335.

To determine whether the list node corresponding to the current tree item is found, the itemID value referenced by listNode must be equal to the ID value of the current tree item (i.e. treeItemID). If the treeItemID value of the current tree item is the same as the itemID value referenced by listNode, the process returns the value of listNode (i.e. indicating that list node containing current tree item is found) and then a reference to the next list node is found, as depicted in block 340. However, if the current tree item is not the same as the itemID referenced by listNode, a command is executed to retrieve the next list node in the linked list 210 (FIG. 2), as depicted in block 345. This search process continues until the list node corresponding to the current tree item is retrieved.

Having retrieved the list node corresponding to the current tree item, a find command is executed to find the next list node (previous or subsequent list node relative to list node of current tree item) in the linked list 210 (FIG. 2), as depicted in block 340. A determination is made as to whether the next list node contains a non-null value, as depicted in block 350. If the next list node has a null value, an error is returned indicating that there is no next list node to navigate to, as depicted in block 355. However, if the next list node has a non-null value, a command is executed to identify the next tree item of the next list node, as depicted in block 360. Once identified, a command to retrieve the tree itemID of the next tree item is executed, as depicted in block 365, and the process terminates at block 370.

Figure 4:
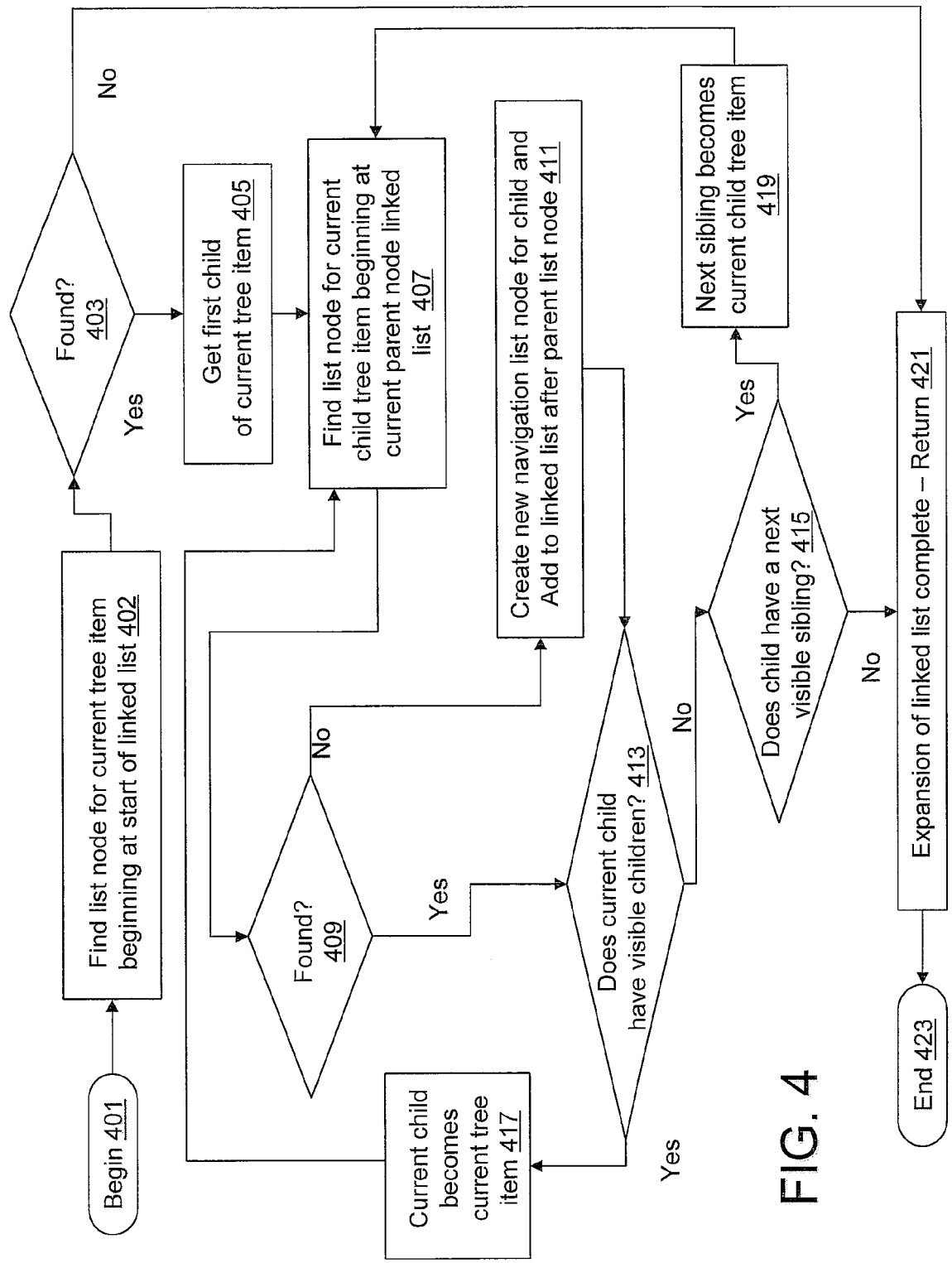
FIG. 4 is a high level logical flowchart illustrating the process of updating a linked list when a branch item is expanded within a tree control structure UI component.

With reference now to FIG. 4, there is illustrated a high level logical flowchart of an exemplary method of updating linked list 210 (FIG. 2B) when a current tree item object having hidden children is expanded (i.e. children are made visible). For exemplary purposes only, it is assumed that ITEM 1 of tree control structure 200 (FIG. 2B) contains children ITEMS 1.1 and 1.2, which are currently hidden (i.e. not currently visible in tree control structure 200 (FIG. 2B)). The process begins at block 401, in response to an updating command signal to expand a current tree item object. Beginning at the start of linked list 210 (FIG. 2B), a search for the list node containing the itemID for current tree item (e.g. ITEM 1 of tree control structure 200 (FIG. 2B)) is undertaken, as depicted in block 402. If the list node for the current tree is not found, the process returns as though the expansion of the linked list has been completed, as depicted in block 423. However, if the list node for the current tree item is found, as depicted in decision block 403, the first child (i.e. ITEM 1.1) of current tree item (ITEM 1) is retrieved 405. Beginning at the corresponding current parent node (node 215 (FIG. 2B)) of linked list 210 (FIG. 2B), a search is executed for the corresponding list node for current child tree item (ITEM 1.1), as depicted in block 407.

At decision block 409, a determination is made as to whether the corresponding list node for current child tree item has been found. If the corresponding list node for the current child tree item is not found, a new linked list node for the current child tree item is created and added to linked list 210 (FIG. 2A) after the parent list node (in this instance, the parent list node is node 215 (FIG. 2A)), as depicted in block 411. If either (i) the corresponding list node for the child tree item is found from decision block 409, or (ii) the new linked list node for the current child tree item is created and added at block 411, a determination is made as to whether the current child tree item has its own visible children, as depicted in block 413. If the current child (ITEM 1.1) has visible children of its own (which in the current example, ITEM 1.1 does not), the current child (i.e. ITEM 1.1) would then become the "current" tree item, as depicted in block 417 and the process would return to block 402. However, if the current child (i.e.

ITEM 1.1) does not have visible children, the next determination that is made is whether the current child (i.e. ITEM 1.1) has a visible sibling, as depicted in decision block 415. In this example, ITEM 1.1 has a visible sibling (i.e. ITEM 1.2). Thus, the next sibling (ITEM 1.2) would become the current child tree item, as depicted in block 419, and the process would return to block 407. Once it is determined that the current child tree item does not have a next visible sibling, the process returns to the parent tree list node and the aforementioned steps are repeated in a recursive manner until all progeny (i.e. all children, and children's children) of parent tree items (i.e. ITEM 1, ITEM 2, ITEM 3) have been added to the linked list 421. Once all visible progeny have been added to the linked list, the expansion of the linked list is completed, as depicted in block 423. The process terminates at block 425.

Figure 5:
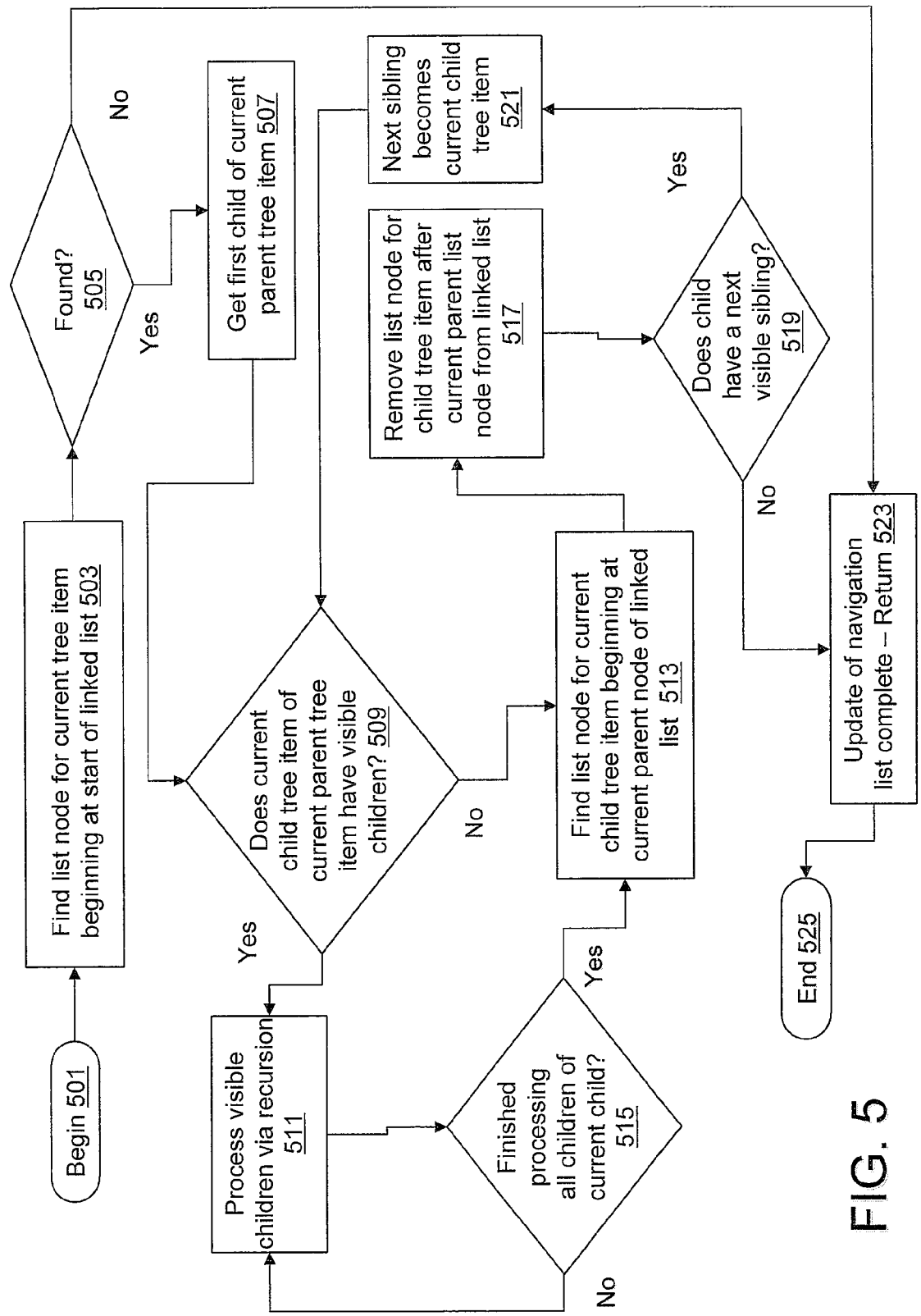
FIG. 5 is a high level logical flowchart illustrating the process of updating a linked list when a branch item is collapsed within a tree control structure UI component.

With reference now to FIG. 5, there is illustrated a high level logical flowchart of an exemplary method of updating linked list 210 (FIG. 2A) when a current branch tree item object is collapsed (i.e. children are made hidden). For exemplary purposes only, it is assumed that branch ITEM 1 of tree control structure 200 (FIG. 2A) containing child leaf ITEMS 1.1 and 1.2 (i.e. currently visible in tree control structure 200 (FIG. 2A)). The process begins at block 501, in response to an updating command signal to collapse a current tree item object (i.e. ITEM 1 of tree control structure 200 (FIG. 2)). Beginning at the start of linked list 210 (FIG. 2A), a search for the list node containing the itemID for current tree item (e.g. ITEM 1 of tree control structure 200 (FIG. 2A)) is undertaken, as depicted in block 503. If the list node for current tree item is not found, the process returns as though the update of the linked list has been completed, as depicted in block 523. However, if the list node for the current tree item is found, as depicted in decision block 505, the first child (i.e. ITEM 1.1) of current tree item (ITEM 1) is retrieved 507.

In decision block 509, a determination is made as to whether the current child tree item (i.e. ITEM 1.1) of the current parent tree item has visible children. If the current child tree item of the current parent tree does not have visible children, the list node for the current child tree item is retrieved, as depicted in block 513. Turning now to block 517, the list node (i.e. list node 220 (FIG. 2)) corresponding to the current child tree item (ITEM 1.1) after the current parent list node (i.e. list node 215 (FIG. 2)) is removed. The removal of the list node for the child tree item occurs after the current parent list node from the linked list.

A determination is then made as to whether the current child tree item has a next visible sibling, as depicted in decision block 519. According to the example shown in FIG. 2A, ITEM 1.1 has a next visible sibling (ITEM 1.2). As a result, sibling ITEM 1.2 becomes the "current" child tree item and the process loops back to block 509, as depicted in block 521. According to tree control structure 200 (FIG. 2A), there appears that ITEM 1.1 does not contain any visible children.

If the current child tree item has visible children, the process continues on to block 511, in which all visible children are processed via recursion. As used herein, the phrase "process via recursion" means the process returns to the parent list node and the previous steps are repeated until all progeny of the parent tree item are removed from linked list 210, as illustrated in FIG. 2B, and depicted in block 511. Once it is determined that the current child tree item does not have a next visible sibling, the process returns an indication that the update of linked list 210 (FIG. 2) is now complete and list node ITEMs 1.1 and 1.2 have been removed from the linked list 210 (FIG. 2), as depicted in block 523. The process terminates at block 525.

In the flow charts above (FIGS. 3-5), one or more of the methods are embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware, or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media includes recordable type (tangible) media such as floppy disks, thumb drives, hard disk drives, CD ROMs, DVD ROMs, and transmission type media such as digital and analog communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A computer implemented method comprising:
    a processor executing code and creating a doubly linked list based on a tree control structure user interface (UI) component, wherein each list node of the doubly linked list corresponds to a visible tree item of the tree control structure UI component;
    responsive to a keyboard event signal, finding a current list node corresponding to a first current tree item;
    finding a next list node corresponding to a next tree item; wherein said next tree item is one of a previous and a subsequent tree item;
    determining whether a list node exists;
    detecting whether the next list node is associated with a null value;
    determining whether the current list node corresponds to a current tree item; and
    when the next list node is associated with a non-null value:
    identifying a next tree item of next list node; and
    returning to the tree control structure UI component an identification of the next tree item, the next tree item representing a second current tree item.

2. The method of claim 1, further comprising:
    updating the doubly linked list responsive to an updating command signal to collapse the current list node, said updating step comprising the steps of:
    identifying at least one child tree item of a current tree item to be collapsed; and
    removing from the linked list at least one child list node corresponding to said at least one child tree item of the current tree item to be collapsed.

3. The method of claim 1, further comprising:
    updating the doubly linked list responsive to an updating command signal to expand the current list node, said updating step comprising the steps of:
    creating a new list node in said doubly linked list corresponding to each visible child tree item present in the tree control structure; and
    adding the new list node after a parent list node of said doubly linked list.

4. The method of claim 1, wherein the keyboard event signal is comprised of one of a keyboard downward arrow signal, a keyboard upward arrow signal, and a keyboard side arrow signal.

5. A data processing system comprising:
    a processor;
    a system memory coupled to the processor; and
    a utility executing on the processor and having executable code for:
    creating a doubly linked list based on a tree control structure user interface (UI) component, wherein each list node of the doubly linked list corresponds to a visible tree item of the tree control structure UI component;
    responsive to a keyboard event signal, finding a current list node corresponding to a first current tree item;
    finding a next list node corresponding to a next tree item;
    wherein said next tree item is one of a previous and a subsequent tree item;
    determining whether a list node exists;
    detecting whether the next list node is associated with a null value;
    determining whether the current list node corresponds to a current tree item; and
    when the next list node is associated with a non-null value:
    identifying a next tree item of the next list node; and
    returning to the tree control structure UI component an identification of the next tree item, the next tree item representing a second current tree item.

6. The data processing system of claim 5, the utility further comprising code for
    updating the doubly linked list to collapse the current list node; said updating step comprising the steps of:
    identifying at least one child tree item of a current tree item to be collapsed; and
    removing from the linked list at least one child list node corresponding to said at least one child tree item of the current tree item to be collapsed.

7. The data processing system of claim 5, the utility further comprising
    code for updating the doubly linked list to expand the current list node, said updating step comprising the steps of:
    creating a new list node in said doubly linked list corresponding to each visible child tree item present in the tree control structure; and
    adding the new list node after a parent list node of said doubly linked list.

8. The data processing system of claim 5, wherein the keyboard event signal is comprised of one of a keyboard downward arrow signal, a keyboard upward arrow signal, and a keyboard side arrow signal.

9. A computer program product comprising:
    a computer storage medium; and
        program code on the computer storage medium that when executed provides the functions of:
        creating a doubly linked list based on a tree control structure user interface (UI) component, wherein each list node of the doubly linked list corresponds to a visible tree item of the tree control structure UI component;
        responsive to a keyboard event signal, finding a current list node corresponding to a first current tree item;
        finding a next list node corresponding to a next tree item; wherein said next tree item is one of a previous and a subsequent tree item;
        determining whether a list node exists;
        detecting whether the next list node is associated with a null value;
        determining whether the current list node corresponds to a current tree item; and
        when the next list node is associated with a non-null value:
        identifying a next tree item of the next list node; and
        returning to the tree control structure UI component an identification of the next tree item, the next tree item representing a second current tree item.

10. The computer program product of claim 9, further comprising code for:

updating the doubly linked list responsive to an updating command signal to collapse the current list node, said updating step comprising the steps of:

identifying at least one child tree item of current tree item to be collapsed; and removing from the linked list at least one child list node corresponding to said at least one child tree item of current tree item to be collapsed.

11. The computer program product of claim 9, further comprising code for:

updating the doubly linked list responsive to an updating command signal to expand the current list node, said updating step comprising the steps of:

creating a new list node in said doubly linked list corresponding to each visible child tree item present in the tree control structure; and adding the new list node after a parent list node of said doubly linked list.

12. The computer program product of claim 9, wherein the keyboard event signal is comprised of one of a keyboard downward arrow signal, a keyboard upward arrow signal, and a keyboard side arrow signal.

\* \* \* \* \*